United States Patent
Quach et al.

(10) Patent No.: US 12,044,130 B2
(45) Date of Patent: Jul. 23, 2024

(54) CERAMIC WALL SEAL INTERFACE COOLING FOR AN AIRFOIL VANE ARC SEGMENT

(71) Applicant: RAYTHEON TECHNOLOGIES CORPORATION, Farmington, CT (US)

(72) Inventors: San Quach, Southington, CT (US); Robert A. White, III, Meriden, CT (US); Tyler G. Vincent, Portland, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/978,315

(22) Filed: Nov. 1, 2022

(65) Prior Publication Data
US 2023/0057881 A1   Feb. 23, 2023

Related U.S. Application Data

(63) Continuation of application No. 17/128,398, filed on Dec. 21, 2020, now Pat. No. 11,499,443.

(51) Int. Cl.
*F01D 11/00* (2006.01)
*F01D 5/28* (2006.01)
(Continued)

(52) U.S. Cl.
CPC ............ *F01D 11/005* (2013.01); *F01D 5/284* (2013.01); *F01D 9/041* (2013.01); *F01D 11/14* (2013.01); *F01D 25/12* (2013.01); *F01D 9/042* (2013.01); *F05D 2220/32* (2013.01); *F05D 2240/55* (2013.01); *F05D 2240/81* (2013.01);
(Continued)

(58) Field of Classification Search
CPC . F01D 9/41; F01D 9/42; F01D 11/005; F05D 2240/80; F05D 2240/81; F05B 2240/80; F05B 2240/801
See application file for complete search history.

(56) References Cited

U.S. PATENT DOCUMENTS

| 5,188,506 A | 2/1993 | Creevy et al. |
| 7,090,459 B2 * | 8/2006 | Bhate ................. F16J 15/46 |
| | | 277/646 |

(Continued)

OTHER PUBLICATIONS

European Search Report for European Patent Application No. 21212964.7 mailed May 23, 2022.

*Primary Examiner* — J. Todd Newton
*Assistant Examiner* — Wesley Le Fisher
(74) *Attorney, Agent, or Firm* — Carlson, Gaskey & Olds, P.C.

(57) ABSTRACT

A gas turbine engine includes a ceramic wall for bounding an engine core gas path. The ceramic wall has a ceramic wall first side that faces the engine core gas path and a ceramic wall second side that faces away from the engine core gas path. There is a metallic wall adjacent the ceramic wall second side. The metallic wall has a metallic wall first side that faces the ceramic wall and a metallic wall second side that faces away from the ceramic wall. The metallic wall and the ceramic wall are spaced apart such that there is a channel there between. There is a seal on the ceramic wall second side, and the metallic wall has at least one cooling hole adjacent the seal for emitting cooling air to cool the seal.

15 Claims, 7 Drawing Sheets

(51) Int. Cl.
   *F01D 9/04*      (2006.01)
   *F01D 11/14*     (2006.01)
   *F01D 25/12*     (2006.01)

(52) U.S. Cl.
   CPC .... *F05D 2260/201* (2013.01); *F05D 2300/20* (2013.01); *F05D 2300/6033* (2013.01)

(56) References Cited

U.S. PATENT DOCUMENTS

| | | | |
|---|---|---|---|
| 7,600,970 B2 | 10/2009 | Bhate et al. | |
| 8,292,580 B2* | 10/2012 | Schiavo | F01D 9/041 |
| | | | 416/96 A |
| 9,523,283 B2* | 12/2016 | Uechi | F01D 5/189 |
| 10,094,239 B2 | 10/2018 | Freeman et al. | |
| 10,100,656 B2* | 10/2018 | Bancheri | F16J 15/0887 |
| 10,196,918 B2* | 2/2019 | McCaffrey | F01D 25/28 |
| 10,196,919 B2 | 2/2019 | O'Leary et al. | |
| 10,208,614 B2* | 2/2019 | Hafner | F01D 9/041 |
| 10,233,764 B2 | 3/2019 | Thomas et al. | |
| 10,240,476 B2* | 3/2019 | Varney | F01D 11/005 |
| 10,294,800 B2* | 5/2019 | Facchinetti | F01D 5/187 |
| 10,480,337 B2* | 11/2019 | Vetters | F01D 11/005 |
| 10,767,497 B2* | 9/2020 | Vetters | F01D 25/005 |
| 10,774,665 B2 | 9/2020 | Geene et al. | |
| 11,008,888 B2* | 5/2021 | Sippel | F01D 9/042 |
| 11,047,247 B2* | 6/2021 | Whittle | F01D 5/284 |
| 11,248,790 B2* | 2/2022 | Sauer | F01D 25/12 |
| 2005/0220611 A1* | 10/2005 | Bhate | F16J 15/46 |
| | | | 415/173.3 |
| 2012/0177479 A1 | 7/2012 | Azad et al. | |
| 2015/0016971 A1 | 1/2015 | Freeman et al. | |
| 2015/0030461 A1* | 1/2015 | Mugglestone | F01D 9/065 |
| | | | 415/115 |
| 2017/0002665 A1* | 1/2017 | Facchinetti | F01D 9/041 |
| 2017/0058686 A1* | 3/2017 | Bancheri | F01D 11/003 |
| 2017/0248029 A1* | 8/2017 | Hafner | F01D 25/12 |
| 2017/0350268 A1* | 12/2017 | McCaffrey | F01D 25/28 |
| 2018/0283194 A1 | 10/2018 | Correia | |
| 2018/0298773 A1* | 10/2018 | Vetters | F01D 11/005 |
| 2019/0323373 A1 | 10/2019 | Smiddy et al. | |
| 2020/0355369 A1 | 1/2020 | Hu | |
| 2020/0149477 A1 | 5/2020 | Barker et al. | |
| 2020/0200024 A1* | 6/2020 | Whittle | F01D 5/282 |

* cited by examiner

CERAMIC WALL SEAL INTERFACE COOLING FOR AN AIRFOIL VANE ARC SEGMENT

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A gas turbine engine according to an example of the present disclosure includes a ceramic wall for bordering an engine core gas path. The ceramic wall has a ceramic wall first side facing the engine core gas path, a ceramic wall second side facing away from the engine core gas path, and a metallic wall adjacent the ceramic wall second side. The metallic wall has a metallic wall first side facing the ceramic wall and a metallic wall second side facing away from the ceramic wall. The metallic wall and the ceramic wall are spaced apart such that the metallic wall first side and the ceramic wall second side define a channel there between. There is a seal on the ceramic wall second side, and the metallic wall has at least one cooling hole adjacent the seal for emitting cooling air to cool the seal.

In a further embodiment of any of the foregoing embodiments, the metallic wall first side includes a groove, and the seal includes a leg that extends into the groove.

In a further embodiment of any of the foregoing embodiments, the at least one cooling hole defines a cooling hole axis that intersects the seal.

In a further embodiment of any of the foregoing embodiments, the at least one cooling hole defines a cooling hole axis that is non-intersecting with the seal.

In a further embodiment of any of the foregoing embodiments, the ceramic wall includes a localized coating and the seal bears against the localized coating.

In a further embodiment of any of the foregoing embodiments, the localized coating includes elemental silicon.

In a further embodiment of any of the foregoing embodiments, the localized coating includes at least one of silicate, silica, hafnia, or zirconia.

In a further embodiment of any of the foregoing embodiments, the seal is metallic.

In a further embodiment of any of the foregoing embodiments, the seal is selected from the group consisting of an L-seal, a C-seal, and a finger seal.

In a further embodiment of any of the foregoing embodiments, the at least one cooling hole defines a cooling hole axis that is oriented at an angle of 20° to 80° relative to a reference axis that is locally perpendicular to the metallic wall first side.

In a further embodiment of any of the foregoing embodiments, the at least one cooling hole defines a cooling hole axis that is locally perpendicular to the metallic wall first side.

In a further embodiment of any of the foregoing embodiments, the seal is in non-contact with the metallic wall.

A gas turbine engine according to an example of the present disclosure includes a ceramic wall bordering an engine core gas path that conveys combustion gas. The ceramic wall has a ceramic wall first side facing the engine core gas path and a ceramic wall second side facing away from the engine core gas path. The combustion gas heats the ceramic wall to a ceramic wall temperature. A metallic wall adjacent the ceramic wall second side has a metallic wall first side facing the ceramic wall and a metallic wall second side facing away from the ceramic wall. The metallic wall first side has a groove therein. The metallic wall and the ceramic wall are spaced apart such that the metallic wall first side and the ceramic wall second side define a channel there between into which the groove opens, there being cooling air that is provided to the metallic wall. A seal partitions the channel and has a leg that extends into the groove. The metallic wall has at least one cooling hole adjacent the groove such that the cooling air flows through the at least one cooling hole and then onto the seal. The cooling air maintains the seal below its temperature limit.

In a further embodiment of any of the foregoing embodiments, the at least one cooling hole defines a cooling hole axis that intersects the seal.

In a further embodiment of any of the foregoing embodiments, the ceramic wall includes a localized coating and the seal bears against the localized coating.

In a further embodiment of any of the foregoing embodiments, the localized coating includes at least one of elemental silicon, silicate, silica, hafnia, or zirconia.

In a further embodiment of any of the foregoing embodiments, the seal is metallic.

In a further embodiment of any of the foregoing embodiments, the at least one cooling hole defines a cooling hole axis that is oriented at an angle of 20° to 80° relative to a reference axis that is locally perpendicular to the metallic wall first side.

In a further embodiment of any of the foregoing embodiments, the at least one cooling hole defines a cooling hole axis that is locally perpendicular to the metallic wall first side.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
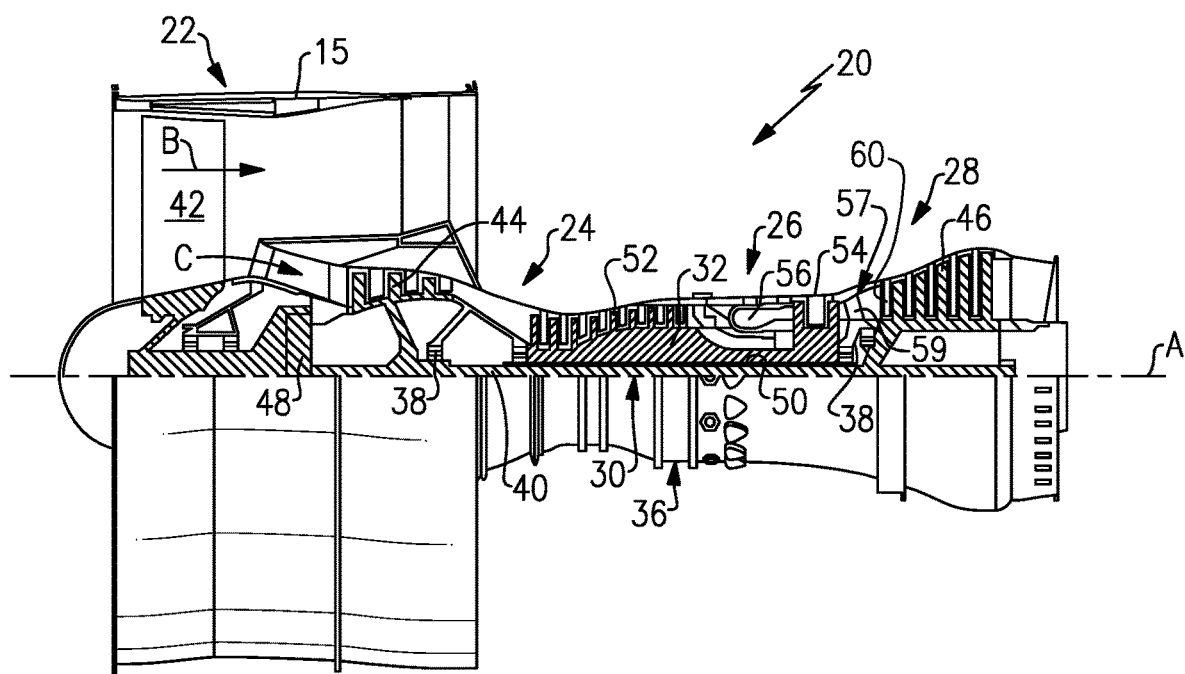
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
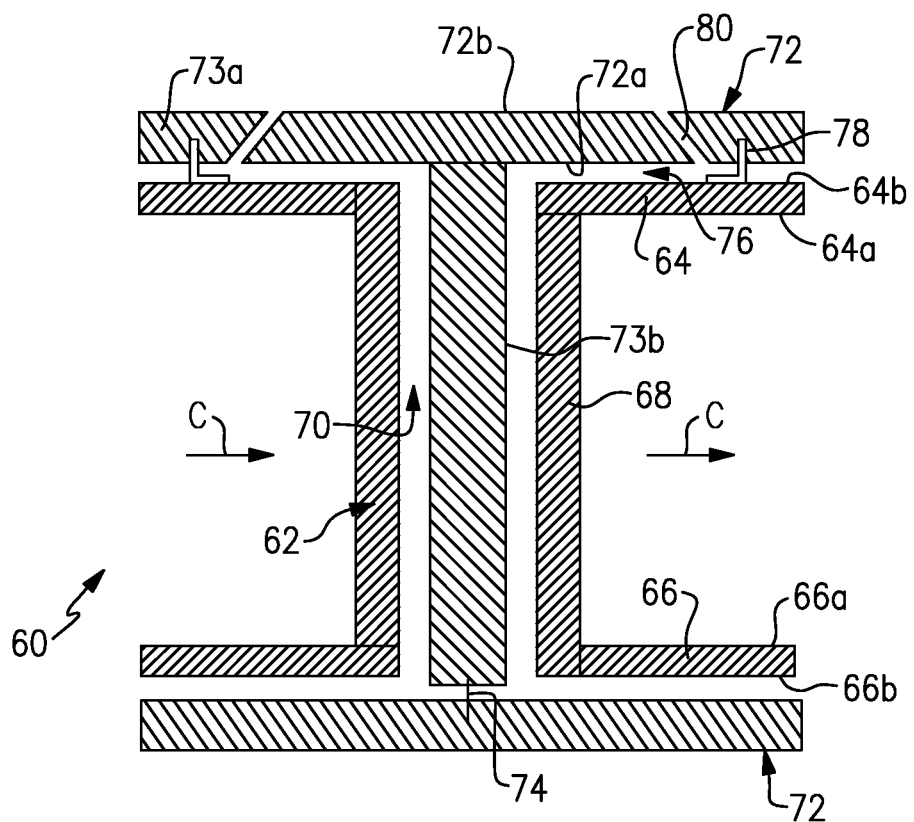
FIG. 2 illustrates an article of the gas turbine engine, which in this example is a vane arc segment.

FIG. 2 illustrates a sectioned view through a gas turbine engine article 60. In the example shown, the article is vane arc segment of a vane ring assembly from the turbine section 28 of the engine 20. It is to be understood, however, that the examples herein are also applicable to other gas turbine engine articles such as, but not limited to, turbine blades, combustor panels, blade outer air seals, and exhaust liners.

The article 60 is comprised of a ceramic wall 62 and one or more metallic walls 72. In this example, the ceramic wall 62 is an airfoil piece that has first and second platforms 64/66 and an airfoil section 68 that extends between the first and second platforms 64/66; and the metallic wall 72 is a spar piece that serves as support hardware. It is to be understood that for articles 60 other than a vane arc segment, the ceramic wall 62 and the metallic wall 72 is have geometries that correspond to a turbine blade, a combustor, a blade outer air seal, an exhaust liner, or other component that borders the core gaspath C of the engine 20. For instance, the ceramic wall 62 and the metallic wall 72 may be panels.

As shown, the airfoil section 68 generally circumscribes a central cavity 70 such that the airfoil section 68 in this example is hollow. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

In this example, the first platform 64 is a radially outer platform and the second platform 66 is a radially inner platform relative to the engine central longitudinal axis A. The ceramic wall 62 of the first platform 64 defines a first side 64a that faces the core gaspath C and a second, opposite side 64b that faces away from the core gaspath C. Likewise, the second platform 66 defines a first side 66a that faces the core gaspath C and a second, opposite side 66b that faces away from the core gaspath C. The sides 64a/66a thus radially bound the core flow path C through the engine 20.

The ceramic wall 62 is formed of a ceramic material. For instance, the ceramic material is a ceramic matrix composite (CMC) that is formed of ceramic fibers that are disposed in a ceramic matrix. The ceramic matrix composite may be, but is not limited to, a SiC/SiC ceramic matrix composite in which SiC fibers are disposed within a SiC matrix. The fibers may be provided in fiber plies, which may be woven or unidirectional and may collectively include plies of different fiber weave configurations.

The ceramic wall 62 is adjacent one or more of the metallic walls 72. In the depicted vane arc segment, the metallic walls 72 are in the form of support hardware for mechanically supporting the airfoil piece. For example, the metallic walls 72 are formed of metallic alloys that can bear the loads received, such as nickel- or cobalt-based superalloys. The support hardware includes a spar that is comprised of a spar platform 73a and a leg 73b that extends radially (inwardly) from the spar platform 72a. The leg 73b extends through the internal cavity 70 and radially past the second platform 66, where it is secured by a fastener 74 with the support hardware at the inner diameter.

The metallic wall 72 defines a first side 72a that faces the ceramic wall 62 and a second side 72b that faces away from the ceramic wall 62. The metallic wall 72 and the ceramic wall 62 are spaced apart at the interface such that there is a channel 76 there between. There is at least one seal 78 on the second side 66b of the ceramic wall 62. The seal 78 is metallic (e.g., nickel- or cobalt-based superalloy) and serves to limit gas flow, the details of which will be determined by the specific implementation. For instance, the seal 78 may block combustion gases in the core gaspath C from entering into the article 60 or block cooling air from within the article 60 from freely leaking into the core gaspath C. The seal 78 may be of a ring or non-ring structure. For example, in the vane, the seal 78 may be a ring that circumscribes the entrance or exit of the cavity 70 at the platforms 64/66. Alternatively, the seal 78 may be a non-ring segment that is either straight or curved.

Figure 3:
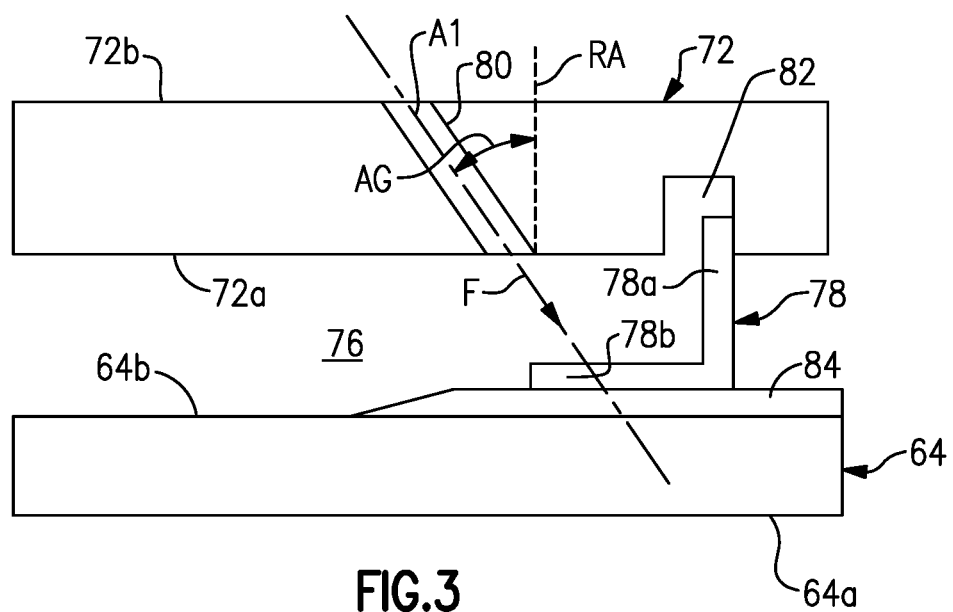
FIG. 3 illustrates a view of a seal of the article of FIG. 2.

Referring also to FIG. 3, the metallic wall 72 has at least one cooling hole 80 adjacent the seal 78 for emitting cooling air F to cool the seal 78. The cooling hole 80 has a circular cross-section and is of uniform diameter along its length. In other examples, however, the cooling hole 80 may be oval, polygonal, stadium, tapered, straight, curved, or combinations of these. In this example, the seal 78 is an L-seal that has first and second seal legs 78a/78b. The metallic wall 72 includes a groove 82, and the first leg 78a extends into the groove 82. The seal 78 is generally trapped between the walls 62/72, and engagement of the leg 78a with the groove 82 limits lateral movement of the seal 78 (in the horizontal direction in FIG. 3).

In comparison to superalloys, the ceramic of the ceramic wall 62 has high temperature resistance and can thus withstand the temperatures in the core gaspath C. The ceramic wall 62, however, may at times heat up to a temperature that exceeds a temperature limit of the seal 78. For example, the temperature limit is a temperature at which the seal 78 no longer meets performance or durability goals or a temperature at which the seal 78 softens or melts. In this regard, the cooling hole 80 includes an entrance at the side 72b such that cooling air F at the side 72b flows through the cooling hole 80. The cooling hole 80 directs the cooling air F toward the seal 78 to maintain the seal 78 below its temperature limit.

As demonstrated in the examples herein, the orientation of the cooling hole 80 relative to the seal 78 can be varied in order to modify the cooling effect. In the illustrated example, the cooling hole 80 defines a cooling hole axis A1 (which is shown as coaxial with the flow of the cooling air F). The cooling hole 80 is sloped such that the axis A1 defines an angle AG with a reference axis RA that is locally perpendicular to the first side 72b of the metallic wall 72 at the exit of the cooling hole 80. For instance, the angle AG is 20° to 80° such the cooling hole 80 slants toward the seal 80 and the cooling hole axis A1 intersects the seal 78.

The cooling hole 80 thus directs the cooling air F to impinge upon the second leg 78b of the seal 78. This provides maximized cooling of the second leg 78b, which bears against the ceramic wall 62 and is thus conductively heated by the ceramic wall 62. As shown, the cooling hole 80 (and thus the angle AG) is in the plane of the figure, which generally intersects the central engine axis A. In one variation, the cooling hole 80 (and thus the angle AG) is out-of-plane of the figure. That is, the cooling hole 80 may be slanted in a circumferential direction about the central engine axis A.

As also shown in this example, the ceramic wall 62 includes a localized coating 84. The coating 84 is present only in the vicinity where the seal 78 bears against the ceramic wall 62. The coating 84 may have a thickness from 0.5 millimeters to 1.6 millimeters, but typically is from 1.0 millimeters to 1.3 millimeters as long as the size of the channel 76 permits. The coating 84 may also enhance secondary thermal considerations. For example, the coating 84 is selected of a composition that is thermally insulating in comparison to the ceramic wall 64, to insulate the seal 78 from the heat of the ceramic wall 62. Alternatively, the coating 84 is selected of a composition that is thermally conducting in comparison to the ceramic wall 64, to serve as a local heat sink for heat removal by the cooling air F. For example, the coating 84 is composed of elemental silicon, silicate, silica, hafnia, zirconia, or combinations thereof. If there are no concerns of wear or secondary thermal considerations, the coating 78 may be excluded in the examples herein.

Figure 4:
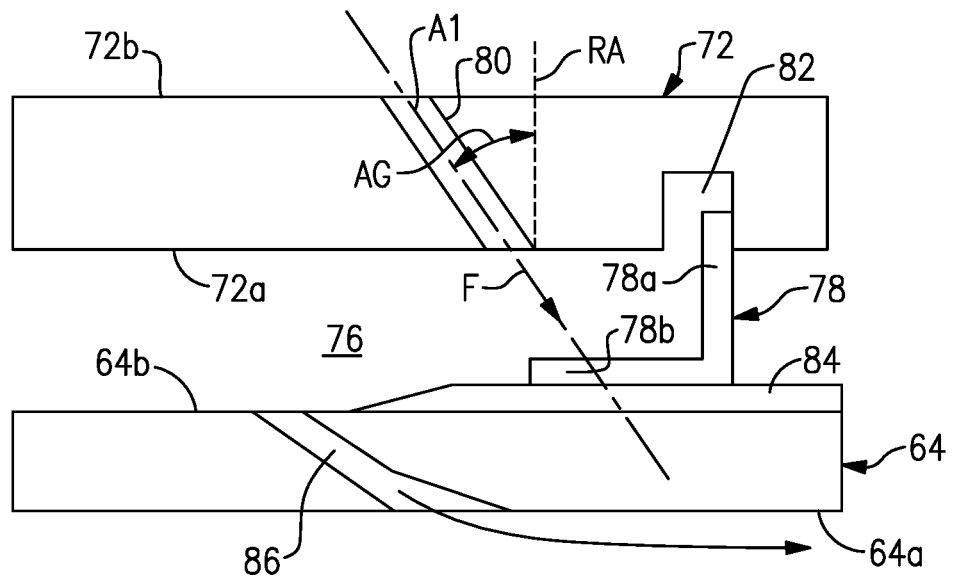
FIG. 4 illustrates another example in which the ceramic wall has a cooling hole.

FIG. 4 illustrates another example that is the same as the example of FIG. 3 except that the ceramic wall 62 includes a cooling hole 86. As shown, the cooling hole 86 is a film cooling hole that has a flared exit, but it is to be understood that the cooling hole 86 may alternatively be another type of hole for the given implementation.

Figure 5:
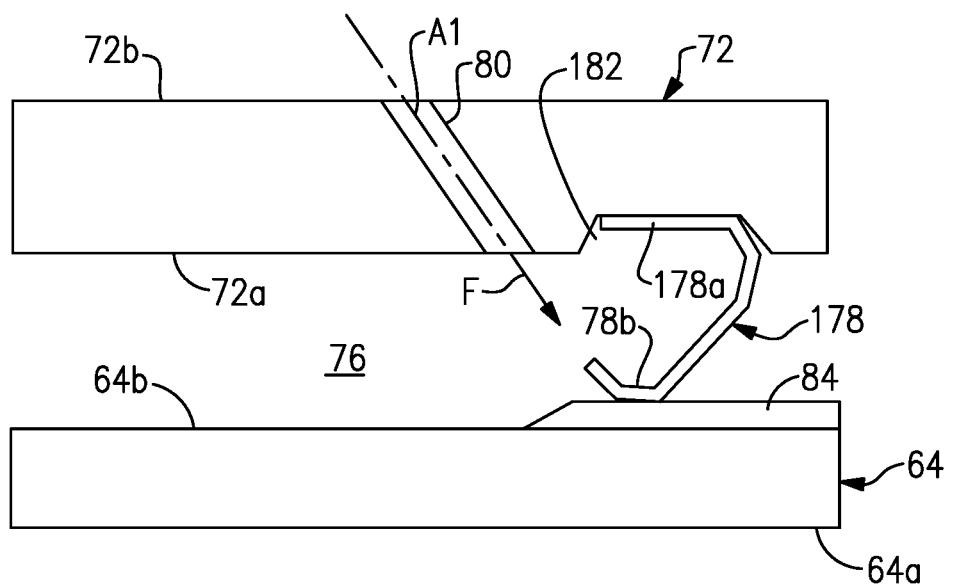
FIG. 5 illustrates another example in which the seal is a finger seal.

FIG. 5 illustrates another example that is the same as the example of FIG. 3 except that the seal is a finger seal 178 and the groove 182 has a wider geometry to receive the leg 178a of the seal 178. In this disclosure, like reference numerals designate like elements where appropriate and reference numerals with the addition of one-hundred or multiples thereof designate modified elements that are understood to incorporate the same features and benefits of the corresponding elements.

Figure 6:
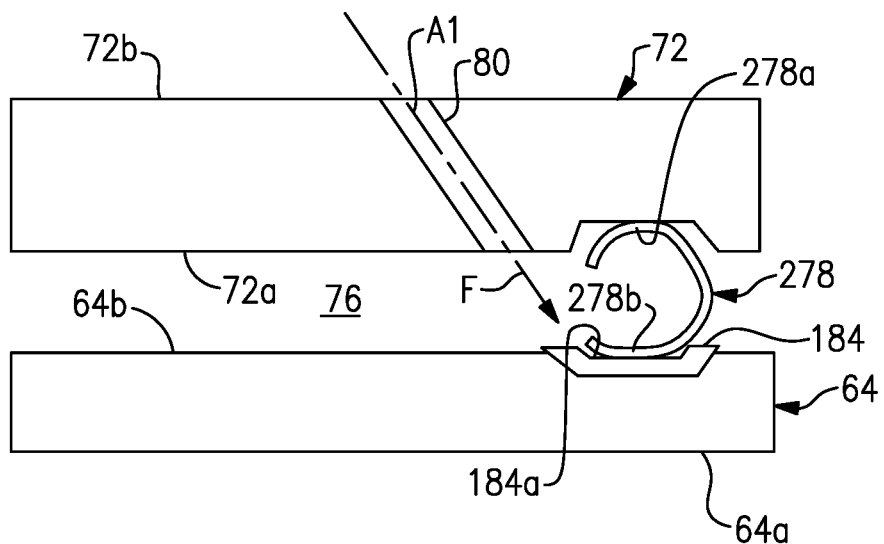
FIG. 6 illustrates another example in which the seal is a C-seal.

FIG. 6 depicts another example that is the same as the example of FIG. 5 except that the seal is a C-seal 278 and the coating 184 has a coating groove 184a. The leg 278a of the seal 287 is received in the groove 182, and the leg 278b is received in the groove 184a to retain the seal 278 between the walls 62/72.

Figure 7:
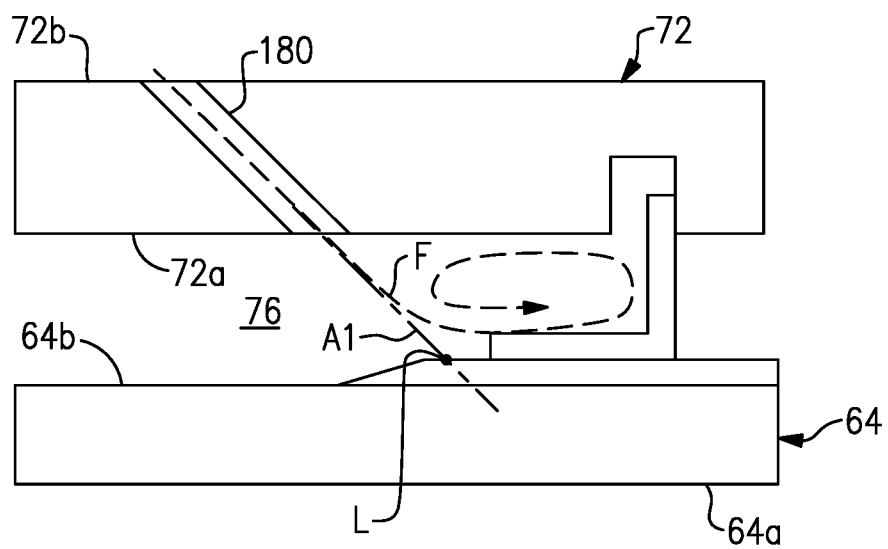
FIG. 7 illustrates another example in which the cooling hole is configured for non-impingement.

FIG. 7 depicts another example that is the same as the example of FIG. 3 except that the cooling hole 180 is displaced from the seal 78. As a result, the cooling hole axis A1 is non-intersecting with the seal 78 and the cooling air F does not directly impinge on the seal 78. Rather, the cooling air F first impinges on the ceramic wall 6 at location L, which here is the portion of the ceramic wall 62 that has the coating 84. By convective flow the cooling air F then travels to the seal 78 to provide cooling. In this configuration, the cooling air F may first absorb heat from the ceramic wall 62 before flow to the seal 78. As a result, the cooling effect on the seal 78 is less than in the example of FIG. 3, although the cooling effect on the localized region of the ceramic wall 62 where the cooling air F impinges is increased.

Figure 8:
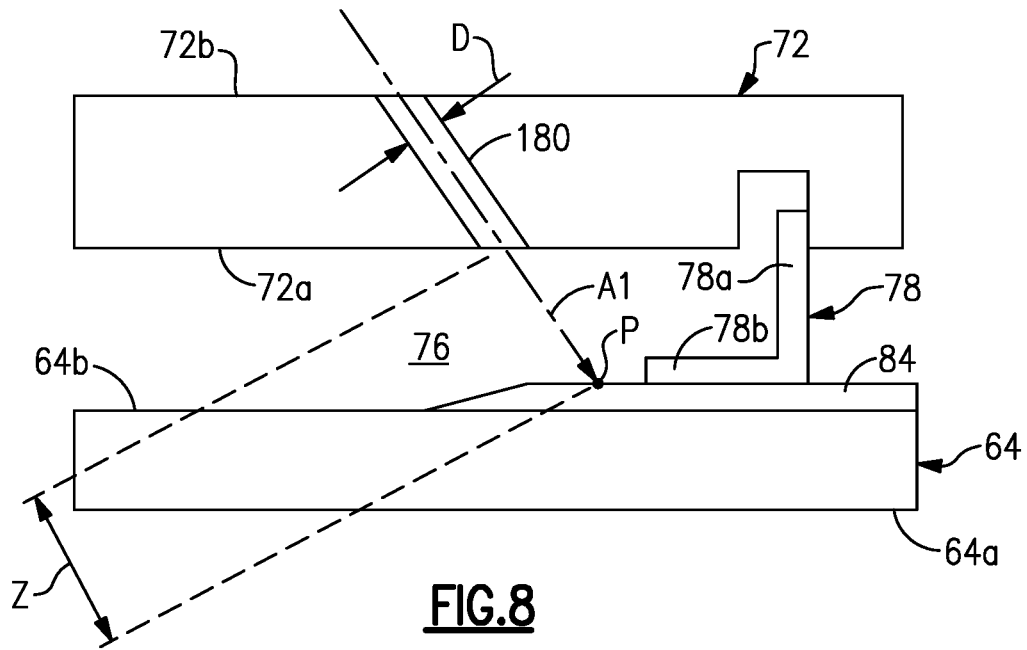
FIG. 8 illustrates another example in which the geometry and orientation of the cooling hole are configured for enhanced convective cooling of the seal.

FIG. 8 illustrates another example that is the same as the example of FIG. 7 except that the geometry and orientation of the cooling hole 180 are configured for enhanced convective cooling of the seal 78. The cooling hole 180 defines a diameter D. For instance, the diameter D is the diameter of the circular cross-section of the cooling hole 180. In examples where the cooling hole 180 is not circular, the diameter D is the hydraulic diameter. There is also an impingement distance Z defined as the length from the exit of the cooling hole 180 to the location L at which the cooling hole axis A1 intersects the ceramic wall 62 or, if present, the coating 84 of the ceramic wall 62. The ratio of Z to D (i.e., Z/D) is 10 or less. The ratio of Z/D impacts the cooling heat transfer coefficient on the impingement surface. At the low and high ends of this range, the impingement is weak and thus provides less effective cooling, while in the middle of the range (e.g., 3-7) impingement is strongest and thus provides more effective cooling. At ratios of Z/D that are above 10, the cooling effect is likely to be too weak to be practically useful for many designs.

Figure 9:
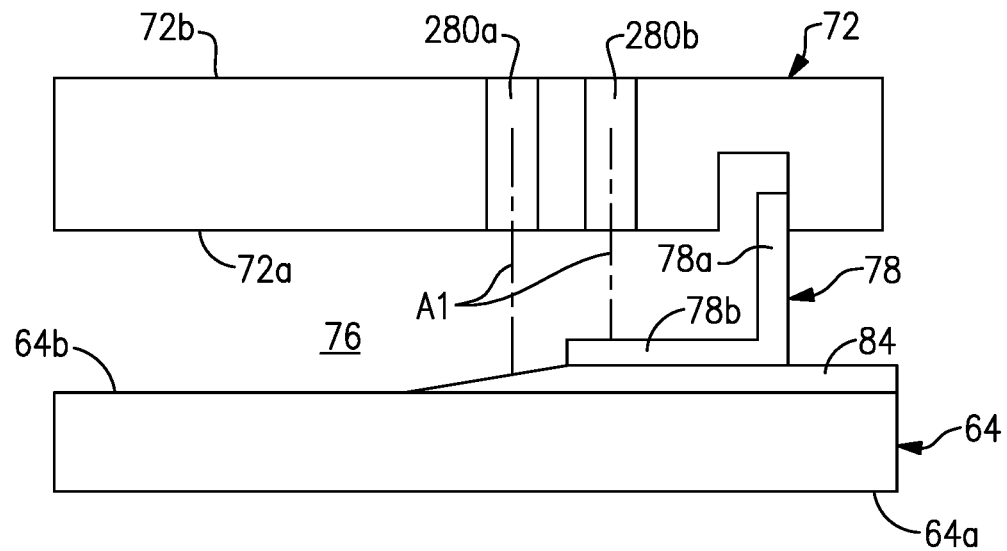
FIG. 9 illustrates another example in which the cooling holes are perpendicular to the side of the metallic wall.

FIG. 9 illustrates another example that is the same as the example of FIG. 3 except that there are multiple cooling holes 280a/280b and the axes A1 of the cooling holes 280a/280b are locally perpendicular to the first side 72b of the metallic wall 72. For example, the perpendicular cooling holes 280a/280b may be used where design considerations do not permit slanted holes. In the example shown, the cooling hole 280a is non-impinging and the cooling hole 280b is impinging. Although 280a is non-impinging, the local region adjacent to the seal 78 will be cooled and thus serve to conduct heat in-plane from the seal 78. It is to be appreciated that further variations of any of the examples herein may include multiple cooling holes, some or all of which are impinging or some or all of which are non-impinging.

Figure 10:
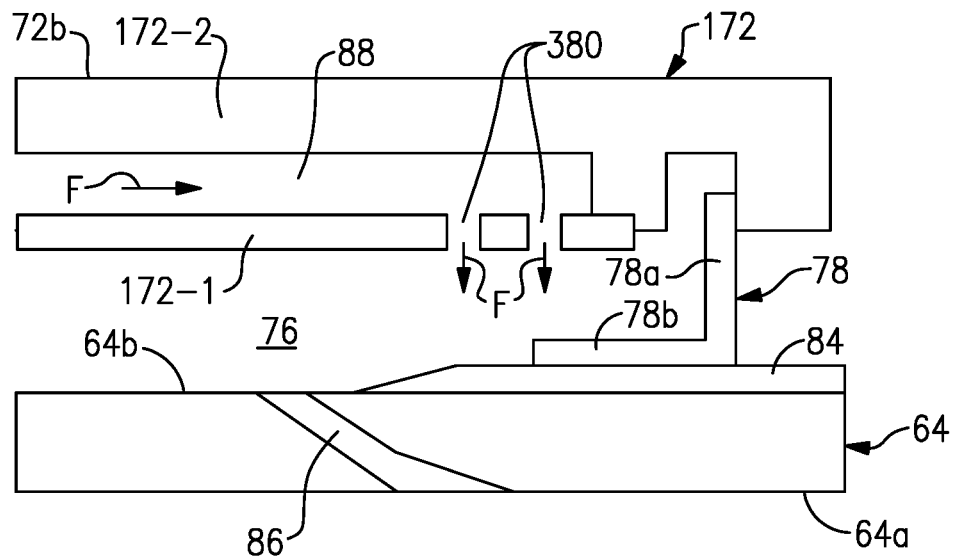
FIG. 10 illustrates another example in which the metallic wall is a compound wall.

FIG. 10 illustrates another example that is the same as the example of FIG. 4 except that the metallic wall 172 is a compound wall. For instance, the metallic wall 172 includes a first wall portion 172-1 on the side adjacent the ceramic wall 62 and a second wall portion 172-2 on the side opposite. The wall portions 172-1/172-2 define a cooling air passage 88 there between. In the illustrated example, the wall portion 172-1 is provided as a separate baffle piece and is positioned adjacent to the wall portion 172-2 to form the cooling air passage 88. In other examples, however, the metallic wall 172 may be cast with a core that forms the passage 88 such that the metallic wall 172 is unitary. Cooling holes 380 connect the cooling air passage 88 to the channel 76. In this example, the cooling air passage 88 receives the cooling air F and directs it through the cooling holes 380. Unlike the cooling air F in the prior examples that is provided at side 72b of the metallic wall 72, the cooling air passage 88 in this example serves to deliver the cooling air F to the cooling holes 280.

Figure 11:
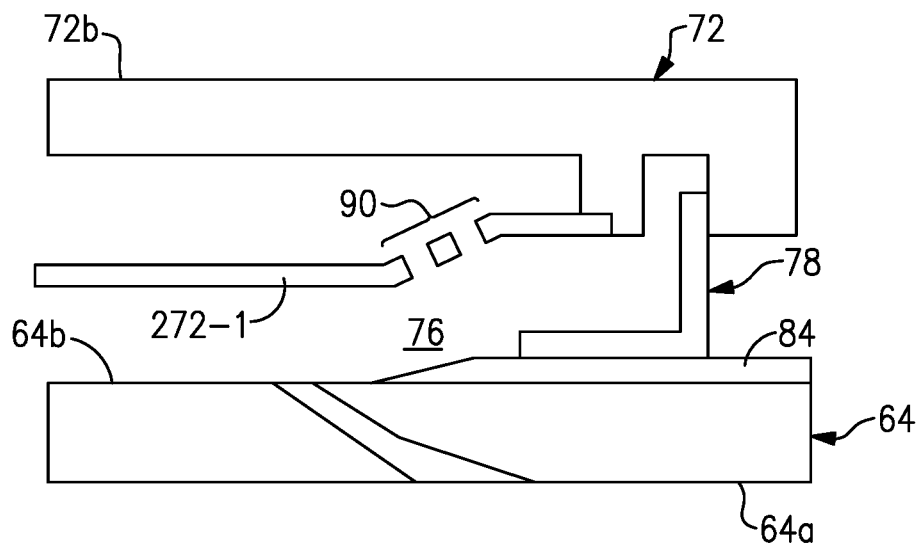
FIG. 11 illustrates another example in which the compound wall is contoured.

FIG. 11 illustrates another example that is the same as the example of FIG. 10 except the first wall portion 272-1 is contoured to have a slanted section 90 through which the cooling holes 380 extend. The slanted section 90 faces toward the seal 78 such that one or both of the cooling holes 380 are impinging.

Figure 12:
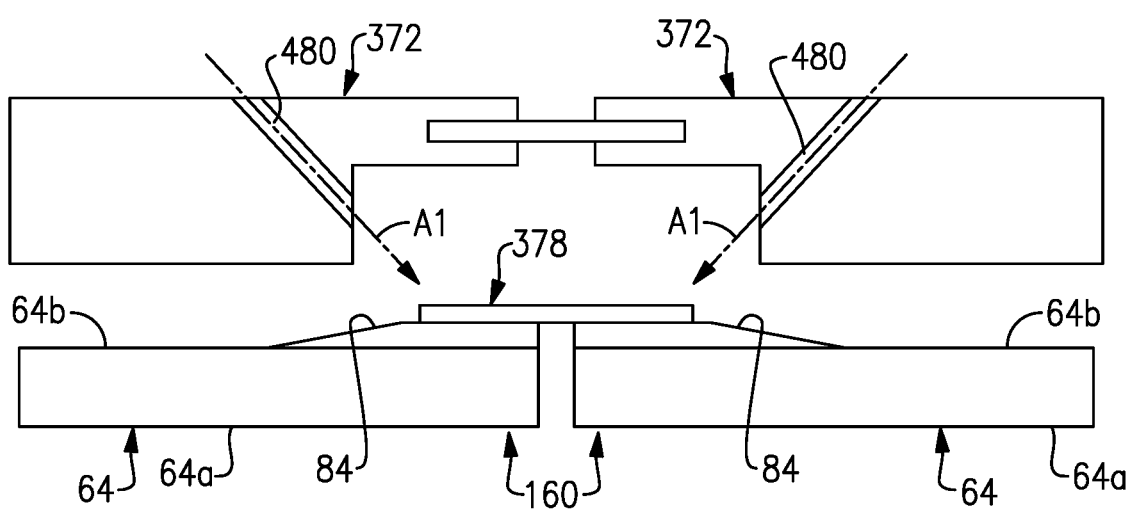
FIG. 12 illustrates another example in which the seal is at a mate face.

FIG. 12 illustrates an example in which the seal 378 is at a mate face joint between two adjacent articles 160. For example, the seal 378 bridges ceramic walls 64 of the article 160 and is in non-contact with the metallic walls 372. Each of the metallic walls 372 has cooling holes 480 that are configured for impingement cooling of the seal 378. As will be appreciated, either or both of the metallic walls 372 may alternatively be configured with cooling holes as in any of the previous examples.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
an airfoil vane arc segment having first and second platforms and an airfoil section there between, the airfoil vane arc segment being formed of ceramic such that the first platform has a ceramic wall for bordering an engine core gas path, the ceramic wall having a ceramic wall first side facing the engine core gas path and a ceramic wall second side facing away from the engine core gas path, the ceramic wall second side including a localized coating that is elemental silicon;
a spar having a spar platform and a spar leg extending from the spar platform and through the airfoil section, the spar being formed of a metallic alloy such that the spar platform has a metallic wall adjacent the ceramic wall second side, the metallic wall having a metallic wall first side facing the ceramic wall and a metallic wall second side facing away from the ceramic wall, the metallic wall and the ceramic wall being spaced apart such that the metallic wall first side and the ceramic wall second side define a channel there between;
a seal on the ceramic wall second side bearing against the localized coating that is elemental silicon; and
the metallic wall having at least one cooling hole adjacent the seal for emitting cooling air to cool the seal, the at least one cooling hole defining a cooling hole axis and a hydraulic diameter (D), there being an impingement distance (Z) defined as a length from an exit of the at least one cooling hole to a location at which the cooling hole axis intersects the ceramic wall, and a ratio of Z/D is from 3 to 7.

2. The gas turbine engine as recited in claim 1, wherein the metallic wall first side includes a groove, and the seal includes a leg that extends into the groove.

3. The gas turbine engine as recited in claim 1, wherein the at least one cooling hole defines a cooling hole axis that is non-intersecting with the seal.

4. The gas turbine engine as recited in claim 1, wherein the seal is metallic.

5. The gas turbine engine as recited in claim 1, wherein the seal is selected from the group consisting of an L-seal, a C-seal, and a finger seal.

6. The gas turbine engine as recited in claim 1, wherein the at least one cooling hole defines a cooling hole axis that is oriented at an angle of 20° to 80° relative to a reference axis that is locally perpendicular to the metallic wall first side.

7. The gas turbine engine as recited in claim 1, wherein the at least one cooling hole defines a cooling hole axis that is locally perpendicular to the metallic wall first side.

8. The gas turbine engine as recited in claim 1, wherein the seal is in non-contact with the metallic wall.

9. The gas turbine engine as recited in claim 1, wherein the at least one cooling hole defines first and second cooling holes, the first cooling hole defining a first cooling hole axis that is intersecting with the seal, and the second cooling hole defining a second cooling hole axis that is non-intersecting with the seal.

10. The gas turbine engine as recited in claim 9, wherein the first and second cooling holes extend off of a common cooling air supply passage in the spar platform.

11. A gas turbine engine comprising:
an airfoil vane arc segment having first and second platforms and an airfoil section there between, the airfoil vane arc segment being formed of ceramic such that the first platform has a ceramic wall for bordering an engine core gas path, the ceramic wall having a ceramic wall first side facing the engine core gas path and a ceramic wall second side facing away from the engine core gas path, the ceramic wall second side including a localized coating that is elemental silicon;
a spar having a spar platform and a spar leg extending from the spar platform and through the airfoil section, the spar being formed of a metallic alloy such that the spar platform has a metallic wall adjacent the ceramic wall second side, the metallic wall having a metallic wall first side facing the ceramic wall and a metallic wall second side facing away from the ceramic wall, the metallic wall and the ceramic wall being spaced apart such that the metallic wall first side and the ceramic wall second side define a channel there between, and the metallic wall including a groove in the metallic wall first side;
a seal on the ceramic wall second side bearing against the localized coating that is elemental silicon, the seal partitioning the channel and having a leg extending into the groove, the seal having a temperature limit; and
the metallic wall having at least one cooling hole adjacent the groove through which cooling air is emitted onto the seal, the cooling air maintaining the seal below the temperature limit, the at least one cooling hole defining first and second cooling holes, the first cooling hole defining a first cooling hole axis that is intersecting with the seal, and the second cooling hole defining a second cooling hole axis that is non-intersecting with the seal.

12. The gas turbine engine as recited in claim 11, wherein the at least one cooling hole defines a cooling hole axis that is non-intersecting with the seal.

13. The gas turbine engine as recited in claim 11, wherein the seal is metallic.

14. The gas turbine engine as recited in claim 11, wherein the at least one cooling hole defines a cooling hole axis that is oriented at an angle of 20° to 80° relative to a reference axis that is locally perpendicular to the metallic wall first side.

15. The gas turbine engine as recited in claim 11, wherein the at least one cooling hole defines a cooling hole axis that is locally perpendicular to the metallic wall first side.

* * * * *